July 16, 1963 E. M. CREAMER, JR 3,098,212
REMOTE CONTROL SYSTEM WITH PULSE DURATION RESPONSIVE MEANS
Filed May 11, 1959
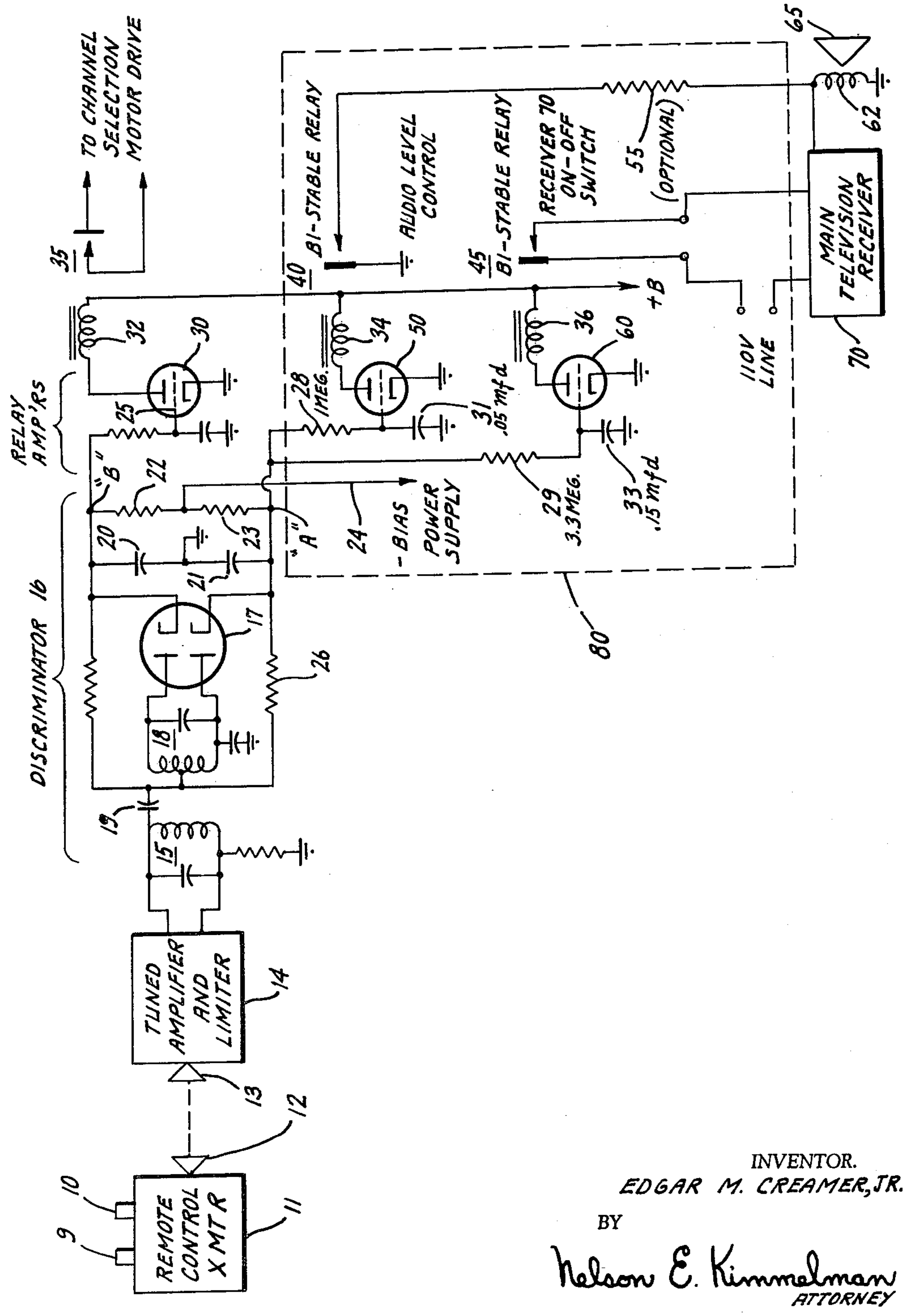
INVENTOR.
EDGAR M. CREAMER, JR.
BY
Nelson E. Kimmelman
ATTORNEY // United States Patent Office 3,098,212

Patented July 16, 1963

3,098,212

REMOTE CONTROL SYSTEM WITH PULSE DURATION RESPONSIVE MEANS

Edgar M. Creamer, Jr., Melrose Park, Pa., assignor, by mesne assignments, to Philco Corporation, Philadelphia, Pa., a corporation of Delaware Filed May 11, 1959, Ser. No. 812,370
2 Claims. (Cl. 340—15)

This invention relates to a signalling system and in particular to a highly useful remote control system of broad applicability, e.g. control of television receivers or telemetering.

Systems are known for controlling apparatus in response to the transmission of a number of signals having different frequencies. In such systems it is necessary that the receiver of the transmitted signals have either a multiplicity of signal paths including respective detectors for signals at each of the different frequencies transmitted, or a single path having a sufficiently wide bandwidth to process all the transmitted signals in the desired manner. Either case requires relatively more expensive and complicated circuitry than is needed by receivers which are required to process a signal at only one frequency or at the most, a few control signals whose frequencies are very close to one another. The expense of the former type of receiver has especial importance when the signalling system is to be used for remote control of selected operations of a commercial television receiver. As is well known, the highly competitive nature of the television set manufacturing industry has sharpened the necessity for reducing manufacturing costs to permit adequate profit margins to be maintained.

In order to keep the cost of a remote control system for television sets low it is very desirable to simplify the transmitting and/or receiving equipment used in the remote control apparatus. One way of doing this would be to transmit a signal which, while having a given single frequency (thereby requiring only one corresponding signal processing path at the receiver), could nevertheless contain sufficient information to perform not just one control function, but a plurality of control functions.

It is accordingly a prime object of the present invention to provide a novel signalling system which is simple and inexpensive.

Another object of the invention is to provide a novel control system wherein a control signal of a given frequency may be employed to effectuate a plurality of control functions.

Still another object of the invention is to provide a remote control system for use with a television receiver wherein a single control signal may be employed to control at least two distinct operating functions of the receiver.

According to my invention I provide a transmitter for sending a control signal wave at a given frequency for different lengths of time, and a receiver therefor. The receiver includes a number of control channels each comprising a control circuit and utilization means. The control circuits have respective resistance-reactance sub-circuits therein which have different time-constants. When the control signal is transmitted during intervals that are of relatively short duration, only predetermined ones of the control circuits having relatively short time-constants are responsive thereto and actuate their associated utilization means. When the control signal is transmitted during intervals which are longer than said relatively short intervals, predetermined ones of the control circuits having relatively long time-constants will respond and actuate their associated utilization means. Also, in accordance with the invention, when the control signal is transmitted during said relatively longer intervals the shorter time-constant control circuits may also be responsive thereto and therefore provision is made for correlating the functions performed by those of the control circuits having longer time-constants with those having the shorter time-constant circuits.

The sole FIGURE illustrates a preferred form of my invention as employed in a television control system.

Referring to the sole figure of the invention, a remote-control system is shown which is designed to control three functions of a television receiver 70, i.e., channel selection, volume level, and off-on switching. While the operation of the system with respect to channel selection will be explained below, it is included solely by way of showing one possible environment of the invention which is described in conjunction with the volume and off-on controls.

A signal transmitter 11 is shown which may consist of a hand-held signal generator that may take a variety of conventional forms, one of which will be explained briefly. It may comprise, for example, a circuit for generating two unmodulated oscillatory waves at respective frequencies of say, 38 kc. and 40 kc. These waves may either be electrical or ultrasonic as desired. Means such as any one of a number of conventional transistor oscillator circuits, or an ultrasonic generator, may alternatively be provided for generating these two signals. For purposes of illustration, it will be assumed that ultrasonic waves are transmitted so that the transmitter 11 includes an electrostatic transducer 12, for example. The transmitter 11 is also shown as being equipped with two manual push-buttons 9 and 10 for actuating the transmission of the 38 kc. or 40 kc. signals respectively. The duration of the production of the desired signal may be controlled by the time interval that the buttons 9 and 10 are depressed.

The ultrasonic signal transmitted when one of the push-buttons is depressed passes through the air and excites an electrostatic ultrasonic microphone 13, for example, which thereupon produces a corresponding electrical oscillatory wave in response thereto. This oscillatory wave is then applied to a conventional amplifier and limiter indicated as being contained within the block 14. The amplifier, of course, must be able to amplify both the 38 kc. and 40 kc. signals so that the minimum bandwidth must be two kilocycles, although wider bandwidths may be desirable to prevent "ringing" due to "shock injection" of the burst of the transmitted wave therein. After amplification the signal is applied to a conventional limiter circuit having an output circuit 15 tuned to a frequency $F_0$ which is the central ("cross-over") frequency for which the following discriminator 16 is adjusted, i.e., 39 kc. The discriminator 16 may be conventional (as shown) comprising a double diode 17 and a tapped inductance-capacitance input tank circuit 18 also tuned to 39 kc. which is coupled to tank circuit 15 inductively (through the inductances) and capacitively through capacitor 19. The capacitors 20 and 21 provide an A.C. path to ground and the resistors 22 and 23 constitute a voltage dividing circuit which is midtapped and connected to a point of negative potential in a power supply (not shown) for biasing off the subsequent relay amplifiers when no control signal is received.

By way of illustrating the environment of the invention, the operation of the signal channel, i.e., the relay amplifier tube 30 and the relay 35 for controlling the tuning of receiver 70, will now be explained although, as explained previously, this channel is not part of the invention. It is assumed that the push-button 10 is depressed so that a 40 kc. signal is transmitted which is amplified and limited in circuit 14 and detected by discriminator 16. There will therefore appear between point "B" and ground a positive D.C. error signal which causes the grid 25 of the relay amplifier tube 30 to become more positive thereby countering the negative cut-off bias supplied to grid 25 via the lead 24 from the power supply (not shown). As a result, the tube 30 will be rendered more conductive and the coil 32 of the relay 35 will be energized causing it to close. When relay 35 closes it actuates, for example, a circuit which causes any conventional channel-selection device (such as a stepped-motor connected to the tuner shaft) to advance the tuner to the next channel.

In accordance with my invention as shown in the dashed-line box 80, two control channels are provided which are constructed to respond selectively whenever a transmitted 38 kc. ultrasonic signal excites the transducer 13. These two control channels comprise, respectively, the relay amplifier (driver) circuit of the tube 50 which controls the bi-stable relay 40, and the relay driver circuit of tube 60 and its associated relay 45. Whenever a 38 kc. signal is transmitted, the discriminator 16 will produce a D.C. signal at "A" which is positive with respect to ground which will be applied simultaneously to the respective input circuits of tubes 50 and 60. In accordance with an important feature of this invention, the D.C. signal between "A" and ground, though applied simultaneously to both input circuits, does not necessarily have the same effect on both tubes 50 and 60, i.e., it does not necessarily turn on or increase conduction within both of the tubes 50 and 60 for reasons which will now be explained in some detail.

To provide the aforementioned selectivity in accordance with my invention I provide that the input circuits to those of the relay driving amplifiers which are to be operated in response to the same frequency signal have different time-constants. Thus the input circuit to the relay amplifier tube 50 comprises, for example, a resistor 28 having a value of 1 megohm and a capacitor 31 having a value of .05 mfd. The input circuit to the relay amplifier tube 60, however, comprises a resistor 29 having a value of 3.3 megohms and a capacitor 33 having a value of .15 mfd. (Actually, the resistor 26, the capacitor 21 and other elements also affect the time-constants, but since they are common to the two input circuits the RC combinations in the latter chiefly determine the ratio of one time-constant to the other.) As a result, the time-constant of the input circuit to the tube 50 is about $\frac{1}{10}$ as long as the time-constant of the input circuit to the tube 60.

In explaining the operation of relay 40 as driven by tube 50 it will first be assumed that it is desirable to control remotely the sound volume of the receiver so that it can be reduced to inaudibility or semi-inaudibility during commercials or when the viewer's telephone rings. In this case the viewer will depress, momentarily, button 9 on the transmitter 11 thereby producing a 38 kc. signal of short duration. The voltage between the grid of the tube 50 and ground will build up quickly in the positive direction to a value sufficient to reduce the negative bias supplied via lead 24. When the bias has been reduced to such an extent that the flow of plate current through tube 50 energizes the coil sufficiently to close the bi-stable relay 40, the latter shorts the voice coil 62 of the loudspeaker 65 which is part of the main receiver 70 and the sound is effectively turned off or, if a resistor 55 is inserted in series therewith, changed considerably in level. The relay 40 is constructed alternately to "latch" in the "open" or "closed" position and may be of the electromechanical type or a tube or transistor circuit. Of course the relay 40 can be connected and arranged to perform any other useful function, if desired.

Having explained what happens in the circuit within block 80 when the viewer depresses push-button 9 momentarily, the operation of the circuit when the viewer depresses the same button for a much longer time, either to turn the set 70 on or off as desired, will now be dealt with. In this case a longer 38 kc. ultrasonic signal is transmitted by transmitter 11, as before, which causes the transducer 13 to produce an electrical 38 kc. wave that is amplified and limited by the apparatus denoted by the block 14 and is detected in the discriminator 16. As in the previous case there will be produced at point "A" a voltage which is positive relative to ground which is applied to the grids of the amplifier tubes 50 and 60 via their respective time-constant circuits. Since the transmitted signal is sufficiently long in duration, the time-constant input circuit (29, 33) of the amplifier tube 60 will be able to charge up to a value such that the corresponding increased conduction through tube 60 will energize the associated relay coil 36 sufficiently to actuate the bi-stable relay 45 to its other stable state, which will turn off the main television receiver 70 if it has been on, or vice versa, inasmuch as relay 45 is a switch in one side of the 110 volt line input.

Furthermore, inasmuch as the 38 kc. signal is transmitted for a much longer interval than before, the shorter time-constant input circuit (28, 31) of tube 50 will, of course, also charge up to its maximum value within a short time thereby causing increased conduction through tube 50, energization of the relay coil 34 and closing (or opening as the case may be) of the bi-stable relay 40 which controls the loudspeaker 65 as has been explained before.

It will be seen that whenever the longer time-constant circuit of relay 45 is actuated by a relatively long 38 kc. signal the shorter time-constant bi-stable relay 40 will also be actuated. Because of this factor, the functions selected for each of these relays should be related as in the cases above. Thus it will not matter if the operation of relay 45 necessarily means that relay 40 will also operate, because if relay 45 turns on the main receiver 70 the sound, if "off," may be turned "on" by a momentary pressure of button 9. If the set 70 has been turned off by a long depression of button 9, no sound will issue therefrom despite the position of the relay 40.

While the invention has been described in terms of a television set remote control system, it is equally useful in any application wherein it is desired that a single frequency signal be capable of selectively actuating different control circuits. By attaching a number of other control channels to point "A" with appropriately different time-constant input circuits, the single transmitted tone can operate desired ones thereof provided the tone is not produced for a time sufficient to actuate undesired control channels having appreciably longer time-constants. As before, it will be understood that if any control circuit having a given time-constant is actuated, all other control circuits having shorter time-constant input circuits are also actuated so that the controlled functions should be related accordingly.

I claim:

1. A system for remotely controlling the power circuit of a television receiver and for remotely changing the level of sound reproduced by said receiver, comprising a transmitter to be located remote from said receiver including means under manual control of the operator for transmitting a continuous wave signal either of a short duration or of a substantially longer duration, means at the location of said receiver to receive said signal, means for translating the received signal into a unidirectional signal of a duration corresponding to the duration of the transmitted signal, a first channel connected to said translating means and including time constant means such that it will respond to said unidirectional signal regardless of whether the latter is of said short duration or of said substantially longer duration, a first bistable relay connected to said channel for control thereby, a circuit arranged to be opened or closed by said relay for changing the level of sound reproduced by said receiver, a second channel connected to said translating means and including time constant means such that it will respond to said unidirectional signal only if the latter is of said substantially longer duration, and a second bistable relay connected to said second channel for control thereby and arranged to control the power circuit of said receiver.

2. A system according to claim 1, wherein each of said channels includes a switching electron device, and each time constant means is connected in the channel input to control said device.

References Cited in the file of this patent

UNITED STATES PATENTS

| | | |
|---|---|---|
| 2,505,566 | Mitchell | Apr. 25, 1950 |
| 2,515,968 | Shanklin | July 18, 1950 |
| 2,562,176 | Curry | July 31, 1951 |
| 2,697,823 | Undy | Dec. 21, 1954 |
| 2,897,354 | Bourget et al. | July 28, 1959 |

OTHER REFERENCES

"Do It By Telephone . . .," Radio and TV News, November 1957, pp. 51–53 and 122.